Patented Aug. 8, 1950

2,517,790

UNITED STATES PATENT OFFICE 2,517,790

DOLOMITIC REFRACTORY AND PROCESS OF MAKING SAME

Vaughn V. Hughey, Tiffin, Ohio, assignor to Basic Refractories, Inc., Cleveland, Ohio, a corporation of Ohio No Drawing. Application September 11, 1947, Serial No. 773,517

2 Claims. (Cl. 117—100)

In the operation of basic open-hearth furnaces it is common practice to use dolomite in either the natural or calcined state as a repair material on the bottom and the banks of the hearth. Raw dolomite is also used to block the charging doors of the furnace to prevent overflow of slag and steel. Natural, or raw, dolomite is the cheapest form of this material, but it has the serious fault that considerable time and heat is required to calcine it and to obtain penetration of slag or iron oxide whereby it is sintered and bonded into a strong, coherent mass. It has been found that this disadvantage can be avoided, in part, by pre-calcining the dolomite so that part or all of the $CO_2$ is removed from the product before use in the furnace. This so-called "single-burned" material or calcined dolomite sinters and bonds into place somewhat more rapidly than does raw dolomite. A material with an even better rate of sintering is obtained by completely calcined or dead burned dolomite grains in the presence of a small amount of finely ground iron oxide which, in the course of the calcination, penetrates the grain and produces considerable shrinkage of the calcined grain and finally reacts to form di-calcium ferrite, $2CaO.Fe_2O_3$, and magnesioferrite, $MgO.Fe_2O_3$. When this dead burned or clinkered material is used to repair the hot furnace hearth after the tapping of a heat of molten metal, the di-calcium ferrite partially fuses and serves to cement the material into a strong, solid mass and to bond it to the furnace lining. However, this product, which is calcined at about 3000° C., is much more costly than either the raw dolomite rock or the calcined product. This arises, in part, from the large quantities of fuel required to produce the desired temperatures and, in part, from the high cost of maintaining the expensive linings in the rotary kiln. Many of the disadvantages of using raw dolomite and the high costs of using the dead burned iron-bearing product could be avoided if an intimate mixture of raw dolomite and iron oxide were to be used as the repair material, but such a mixture would separate so extensively that the desired end could not be attained. The present invention provides a unique method of preparing a stable product of dolomite and a flux. This product, consisting essentially of raw dolomite plus the desired iron-bearing flux, can be placed in the furnace without appreciable segregation. It is rapidly and easily sintered into place at the furnace temperatures. In the use of this product, advantage is taken of the heat of the furnace to calcine the dolomite and to flux it with the admixed iron oxide to form a strong, solid mass which bonds well to the furnace lining.

To the accomplishment of the foregoing and related ends, the invention, then, comprises the features hereinafter fully described and particularly pointed out in the claims, the following description setting forth in detail certain illustrative embodiments of the invention, these being indicative, however, of but a few of the various ways in which the principle of the invention may be employed.

A desirable flux oxide, usually iron, e. g. finely ground iron oxide, such as mill scale and roll scale, pyrite sinter, hematite, magnetite or other similar iron ore products can by the present invention be cemented to the raw dolomite grains by means of related magnesia cement, such as with a reactive magnesium salt, and preferably magnesium oxychloride cements. The process by which this is accomplished is described below.

Clean dolomite grains, crushed to a size desired or suitable for fettling in the open hearth furnace, are used for processing. For example, a grain of about ¼" diameter is an advantageous size. Usually, one hundred parts by weight of the sized stone are mixed with 3 to 15 parts of iron oxide ground to 50% minus 200 mesh or finer, about 0.5 to 1.5 parts of finely ground active calcined magnesia or calcined dolomite, 0.5 to 1.25 parts of $MgCl_2$ and sufficient water to adequately wet the material, for instance 3.0 to 3.5 parts of water. These ingredients are mixed in any suitable type of mechanical mixer so that each grain of dolomite is completely coated with the slurry of bonding cement and fluxing agent. The moist mass is then dried either in batches or continuously in some suitable type of dryer. This can conveniently be a rotary dryer with direct firing. During the warming and drying process a reaction occurs between the magnesia, or calcined dolomite, and the magnesium chloride solution to form a cement which adheres strongly to the dolomite grains and binds the iron oxide particles thereto. This is a strong adherent coating which withstands the rough handling and tumbling in its final use. It has been found that this coating will adhere during subsequent calcination in furnace usage and that a uniformly sintered material can be obtained upon heating to open hearth furnace temperatures. The process can be used with dolomite or dolomitic limestone grains of any size suitable for open hearth lining repairs.

The iron oxide may be in any convenient form and may be either an artificial product or one found in nature. The iron oxide scales produced in the manufacture of iron and steel products, iron oxide sinters formed by the calcination of pyrites and natural oxide or carbonate ores, such as siderite, hematite, magnetite or limonite, are suitable sources. The iron oxide or iron ore flux preferably should be ground to 70-90% minus 200 mesh before mixing. Any suitable grinder may be used, such as a ball mill. It has been found that the more finely ground material gives a more complete adherence to the dolomite grain and, therefore, it is desirable to grind the flux as fine as possible. The quantity of iron oxide used is not critical as regards the type of oxychloride bonding obtained, but it may be varied to give the concentration of iron in the sintered product found most desirable by the furnace operator. The iron oxide added to the raw mixture has been varied, for instance, between 4 and 15 parts of iron oxide by 100 parts by weight of raw dolomite. When this material was fully calcined, the iron content varied between 6.7 and 21% calculated as $Fe_2O_3$. A lesser or a greater quantity of iron oxide could be used satisfactorily.

No essential difference has been found in the quality of bond obtained when either actively calcined magnesia or actively calcined dolomite has been used to form the oxychloride cement. In either case the calcine should be freshly prepared and with a sufficiently low ignition loss so as to readily react with magnesium chloride solution to produce a strong cement. The active magnesia or calcined dolomite preferably should be ground before mixing to 80% minus 200 mesh or finer. A convenient size has been found to be 90% minus 200 mesh.

Magnesium chloride can be introduced either as a solid or as an aqueous solution. It has been found most convenient to introduce it as a strong aqueous solution containing, e. g., 28% $MgCl_2$. The magnesium chloride may be any commercial grade of magnesium chloride. The use of this material as a solution promotes a uniform mixing with the other ingredients and produces a more adherent coating. In general, it has been found that the water requirement for the mixing operation is usually 3 to 3.5 parts of water per 100 parts by weight of raw dolomite. The proportion of water to raw stone will vary somewhat, due to natural variations in porosity and initial water content of dolomite grains. A porous stone will require more water than a dense, impervious stone. When too small an amount of water is used, the resulting thick slurry will not adhere uniformly to the dolomite grains and an uneven distribution of flux and bond will be obtained. Water in too great a quantity produces a thin slurry of bond and flux which flows off the grains and segregates in the bottom of the mixer and subsequent conveying equipment. The quantity of water can best be adjusted by noticing the appearance of the mix and regulating it to give a mixture in which uniform distribution is obtained and the slurry is sufficiently adherent to remain on the dolomite grains during the drying process. This is a simple adjustment to one skilled in the art.

As mentioned above, the mixing can be carried out in any suitable type of mechanical mixer such as pug mill, rotary cement mixer, pan mixer, tumbling drum, etc. Drying can either be carried out batchwise or in a continuous manner using any convenient type of drying equipment where heated gases are passed over the drying mass to remove moisture. A very convenient form of drying equipment is a direct-fired rotary dryer in which the material is passed through the dryer counter-current to the flow of hot gases. The temperature of the product at end of the drying stage may vary between 120 and 400° C., or below the decomposition temperature of magnesium oxychloride cements. The dryer may be fired with any convenient fuel such as coal or oil, or use may be made of waste heat from any source, e. g., rotary kilns or open-hearth furnaces.

As one example of this process, 200 parts by weight of dolomite stone, sized to essentially minus ⅛″, were mixed by tumbling with 12 parts of ground hematite iron ore, 1 part of finely ground active calcined magnesia, and 1 part of $MgCl_2$ and 7 parts of water. The mixture was then dried at a temperature of 120 to 150° C. On subsequent tests, 80% of the iron oxide was retained on the dried material after tumbling for one hour. On complete calcination, as in a furnace hearth, at a temperature of approximately 1600° C. the final sintered product contained 8.6% $Fe_2O_3$.

In a further example of the process, 200 parts by weight of crushed dolomite stone, sized to essentially minus ⅛″, were mixed with 12 parts of mill scale ground to 90% minus 200 mesh, 1 part of finely ground magnesium oxide, 1 part of magnesium chloride, and 7 parts of water. This material was mixed by tumbling and dried in a batch dryer at 120 to 150° C. After tumbling a portion of this batch for one hour, it was found that 97.5% of the mill scale originally was still adherent to the product. After complete calcination at 1600° C., the sintered product contained 10.1% $Fe_2O_3$.

As a still further example of this process, 200 parts by weight of dolomite grains, sized to essentially minus ⅛″, were mixed in a rotary cement mixer with 2.4 parts of finely ground active calcined dolomite, 1 part of magnesium chloride, 7 parts of water and 12 parts of finely ground mill scale. 68% of the mill scale was retained after tumbling a portion of the dried product for one hour and the final calcined product contained 7.7% $Fe_2O_3$. It is believed that this batch was low in adhesion due to a very high initial water content in the raw stone. A special test on this particular product was made in which a 500-gram portion of the coated product was sprayed three times with one quart of water followed by drying after each spraying. After the final drying, a small sample of this washed product was calcined and the iron oxide content determined. This was found to contain 6.9% $Fe_2O_3$ as compared to 7.7% as the sample calcined without washing. This shows that the bond is essentially water-resistant and the flux is retained even after repeated wetting.

In an additional example of this process, 200 parts by weight of crushed dolomite stone, sized to essentially minus ⅛″, were mixed by tumbling with 8 parts of mill scale ground to 90% minus 200 mesh, 1 part of finely ground active calcined magnesia, 1 part of $MgCl_2$ and 7 parts of water. The mixture dried at 120° C. to 150° C. Over 95% of the mill scale was cemented to the dolomite stone after tumbling for one hour. After being subsequently fully calcined, the product contained 6.7% $Fe_2O_3$.

It has also been found possible to obtain a bond by using bitterns containing calcium chloride and magnesium chloride in this process, for example containing 1.5 to 3.0 parts of calcium chloride for each part of magnesium chloride. Though the product obtained with the use of such a material is hygroscopic in nature and less water resistant, in certain instances it may be found advantageous to use such a bonding agent.

Other modes of applying the principle of the invention may be employed, change being made as regards the detail described, provided the features stated in any of the following claims, or the equivalent of such, be employed.

I therefore particularly point out and distinctly claim as my invention:

1. A process of making a refractory, comprising tumbling crushed dolomite in unburned state in proportion of 100 parts with 3–15 parts by weight of iron oxide, 0.5–1.5 parts of active magnesia, the iron oxide being in proportion greater than such magnesia, 0.5–1.25 parts of magnesium chloride, and water about 3–3.5 parts, and reacting the magnesium chloride.

2. Crushed dolomite in unburned state and having chemically cemented to its particle surfaces per each 100 parts a coating of 3–15 parts by weight of iron oxide, 0.5–1.5 parts magnesia, the iron oxide being in proportion greater than such magnesia, and 0.5–1.25 parts of magnesium chloride.

VAUGHN V. HUGHEY.

REFERENCES CITED

The following references are of record in the file of this patent:

UNITED STATES PATENTS

| Number | Name | Date |
| --- | --- | --- |
| 1,329,434 | Sheard et al. | Feb. 3, 1920 |
| 1,664,631 | Koehler | Apr. 3, 1928 |
| 1,876,630 | Denning | Sept. 13, 1932 |
| 2,029,627 | Lloyd et al. | Feb. 4, 1936 |
| 2,253,955 | Hebbe | Aug. 26, 1941 |